United States Patent [19]

Lowery et al.

[11] 4,052,099
[45] Oct. 4, 1977

[54] ONCOMING AIR SPOILERS FOR VEHICLES, MOUNTED NEAR THE HOOD TO DEFLECT AIR CARRIED BUGS, RAIN, ROAD SPRAY, SNOW, AND LIGHTWEIGHT DEBRIS UP AND AWAY FROM THE WINDSHIELD

[75] Inventors: Dennis J. Lowery; Robert E. Merchant; Milton A. Walls, all of Grand Junction, Colo.

[73] Assignee: Dixson, Inc., Grand Junction, Colo.

[21] Appl. No.: 684,142

[22] Filed: May 7, 1976

[51] Int. Cl.² ............................................. B60J 1/20
[52] U.S. Cl. ............................. 296/91; 224/42.45 R; 248/DIG. 9
[58] Field of Search ................... 296/91; 180/68 P; 224/29 R, 42.45; 248/DIG. 9

[56] References Cited

U.S. PATENT DOCUMENTS

| | | | |
|---|---|---|---|
| 3,015,517 | 1/1962 | Thornburgh | 296/91 |
| 3,815,700 | 6/1974 | Mittendorf | 296/91 |
| 3,831,696 | 8/1974 | Mittendorf | 296/91 |
| 3,863,728 | 2/1975 | Mittendorf | 296/91 |
| 3,987,863 | 10/1976 | Mittendorf | 296/91 |
| 3,999,663 | 12/1976 | Walter | 248/DIG. 9 |

FOREIGN PATENT DOCUMENTS

| | | | |
|---|---|---|---|
| 818,287 | 7/1969 | Canada | 296/91 |

*Primary Examiner*—Joseph F. Peters, Jr.
*Assistant Examiner*—John A. Carroll
*Attorney, Agent, or Firm*—Roy E. Mattern, Jr.; Kenneth S. Kessler; David H. Deits

[57] ABSTRACT

Dual oncoming air spoilers for vehicles are mounted near the hood to deflect air carried bugs, rain, road spray, snow, and lightweight debris up and away from the windshield. They are provided essentially in a one embodiment kit having: two plastic panels; two bottom channels to respectively receive the two panels; four bendable and breakaway pre-drilled and countersunk brackets to be used in securing the bottom channels and their inserted bottom edges of the dual oncoming air spoilers to a front of a vehicle on or near the hood and standard fastener assemblies, all these components being assembled and installed using conventional hand tools for drilling access holes to receive the fastener assemblies and to secure them. By following selective installation procedures, the contents of this one embodiment kit are mountable on many different vehicles having many different hood widths and hood contour designs. For example the dual oncoming air spoilers are spaced apart on wider vehicles and arranged end to end on narrower vehicles. The pre-drilled countersunk malleable, bendable, breakaway brackets, usable, end for end, in a variety of positions and places, and being breakable at different lengths for respective different vehicle mountings, make this one embodiment kit of dual oncoming air spoilers installable on all vehicles having an extending hood configuration.

1 Claim, 14 Drawing Figures

ONCOMING AIR SPOILERS FOR VEHICLES, MOUNTED NEAR THE HOOD TO DEFLECT AIR CARRIED BUGS, RAIN, ROAD SPRAY, SNOW, AND LIGHTWEIGHT DEBRIS UP AND AWAY FROM THE WINDSHIELD

BACKGROUND OF THE INVENTION

When production vehicles are driven, oncoming air carried bugs, rain, road spray, snow, and light debris, often cover the vehicle windshield to seriously obscure the driver's vision. Frequent cleaning of a windshield is then needed before a gas stop, yet some drivers, either because of the lack of a safe convenient side of the road stopping place, and/or because of trying to avoid a delay, proceed on down the road taking a chance that an accident will not occur because of their poor view ahead. These hazardous vision conditions have been known for a long time and solutions have been offered by others. For example, Mr. Thornburgh in his U.S. Pat. No. 3,015,517, issued in 1962, describes the inventions of others that proceeded him, and also his own air current deflector shield.

In the practice of Mr. Thornburgh's invention for each manufacturer's vehicle and often for each different vehicle line produced even by the same manufacturer, such an air current deflector shield is specifically designed, specifically manufactured, and specifically installed on one particular line of production vehicles. Such air current deflectors designed, manufactured, and installed on other vehicles of different lines and/or manufacturers were therefore manufactured differently with respect to their height, width, curvature, mounting brackets, and fastener assemblies.

As a cnsequence their marketing was limited and many different sizes had to be stocked by distributors and dealers. Therefore there remained a need for a more widely marketable product, which, in one embodiment or model, more universally could be mounted on vehicles of different manufacturers and also the different lines of the same manufacturer.

SUMMARY OF THE INVENTION

In one embodiment or model, generally offered in a kit form, an oncoming air spoiler, having end to end plastic panels, is installed on any vehicle of any manufacture, near the hood to deflect air carried bugs, rain, road spray, snow, and lightweight debris, up and away from the windshield. Moreover, heavier debris such as stones and larger bugs, not completely deflected within the oncoming air, hit the windshield at a grazing angle, rather than at a near normal or normal angle, thereby avoiding bug splats and other wise severe stone damage.

This one embodiment or model utilizes these end to end plastic panels, or dual oncoming air spoilers, so the space between their ends at the middle of the front of the vehicle hood may be varied. On smaller cars these dual air spoilers, formed as air deflector and air turbulence creating panels, are closely spaced or are in contact. Whereas, on larger cars they are spaced farther apart, yet they still perform the overall air deflecting function.

The varied placement of the dual air spoilers is undertaken using conventional hand tools, by employing two receiving bottom channels to respectively receive the bottom edge portions of the plastic panels, serving as the oncoming air spoilers; and four bendable and breakaway, predrilled and countersunk universal mounting brackets, which, in conjunction with standard fastener assemblies, are used together to secure the plastic panels to these bottom channels, and then bottom channels to the hood or nearby hood structures of the vehicles.

As a consequence of essentially a one embodiment kit being universally installable on any vehicle having a conventional hood extending beyond a windshield, these oncoming air spoilers, sometimes quickly referred to as bug shields, are sold through auto parts stores, catalog houses, car dealers, mass merchandizing organizations, and also smaller sales outlets. This increased marketing distribution is made possible by having the universal overall design, which creates essentially the one kit embodiment, as the only embodiment, that must be stocked, sold, installed, and/or serviced. Moreover, this kit embodiment when packed for shipment, storage, and other handling, is compactly arranged within a comparatively small and easily handled shipping package.

DESCRIPTION OF THE DRAWINGS

The preferred embodiment of the oncoming air spoiler, often offered in a kit, is illustrated in the drawings, wherein.

DESCRIPTION OF PREFERRED EMBODIMENT

Figure 1:
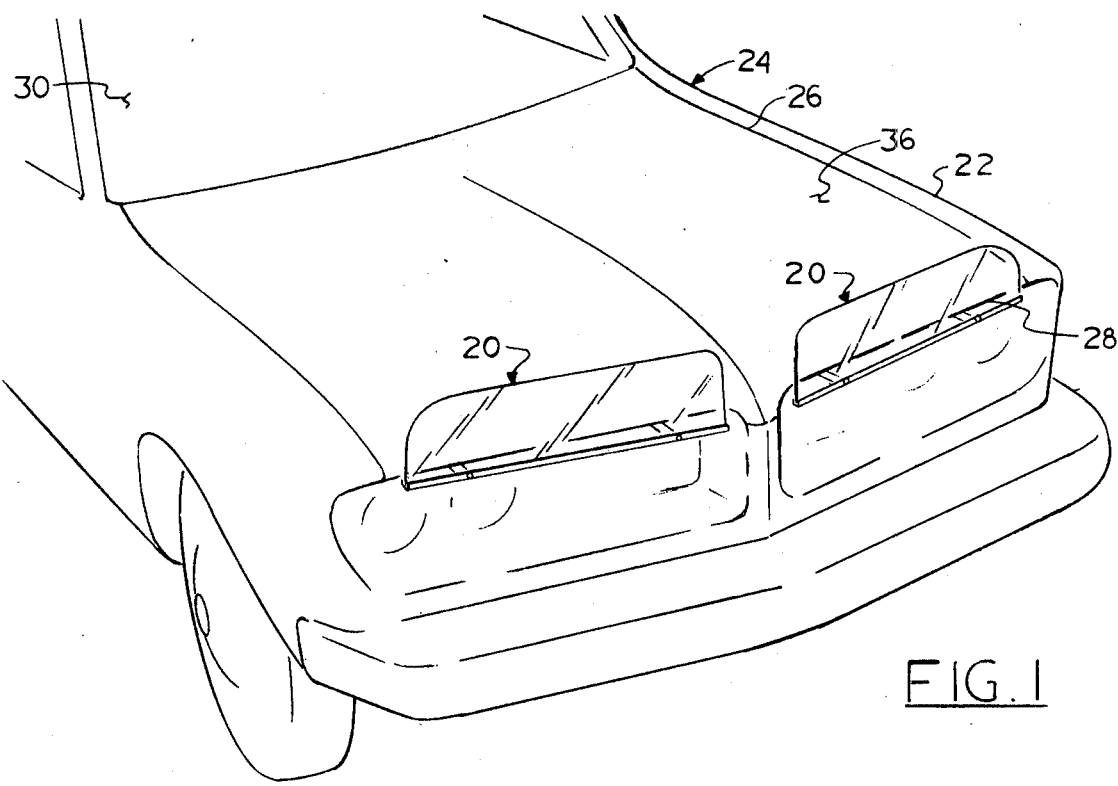
FIG. 1 is a perspective partial view of a front of a regular size passenger car having an extending hood, which is generally uniformly level and somewhat blunt across the front as it depends downwardly a short distance, showing how the oncoming air spoiler, utilizing the two plastic panels, is mounted.

The Utilization and General Arrangement of the Overall Oncoming Air Spoiler

An embodiment of an oncoming air spoiler 20 for various vehicles 22, having a projecting hood 24, is illustrated throughout FIGS. 1 through 13, as it is specifically available in a starting compact kit form to be universally mounted on many vehicles. This air spoiler 20 is so mounted near the front 26 of a vehicle's hood 24 to serve as an air spoiler in reference to the oncoming air, whereby this air is directed and made turbulent, to in turn beneficially deflect, up and away from a windshield 28, air carried bugs, rain, road spray, snow, and lightweight debris. Moreover, heavier debris such as stones and larger bugs, not completely deflected within the oncoming air stream, hit the windshield at a grazing angle rather than at or near a normal angle, thereby avoiding bug splats, and otherwise severe stone damage. In driving during distressing weather conditions, the motorist is thereby provided with better visibility, substantially adding to the safety of his or her motoring trips.

Figure 2:
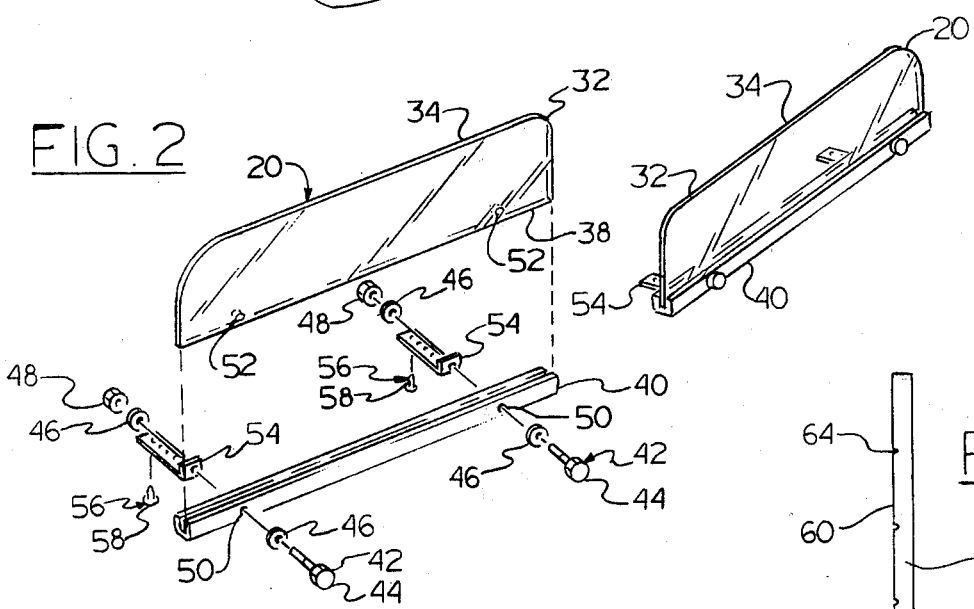
FIG. 2 is a partially exploded view and a partially assembled view of the contents of a kit embodiment of the oncoming air spoiler indicating on the left how some of the components are initially arranged in a pattern before their assembly, and indicating on the right how they are assembled for mounting as illustrated in FIG. 1.

As illustrated in the partial perpsective view of FIG. 1 and also in the partially exploded and partially assembled view of FIG. 2, the oncoming air spoiler 20 in dual sub-assemblies, oftentimes quickly referred to as the bug screen 20, which deflects the oncoming air, etc., has two identical rectangular air deflector plastic panels 32, 32, positioned with their top edges 34 in a selectable range of generally 2 inches to 6 inches above the essentially horizontal top 36 of the vehicle's hood 26. Each plastic panel 32 has its bottom edge portion 38 fitted into a supporting co-extensive channel 40. At selected locations along the channel 40, fastener assemblies 42 are used to secure the air deflector panels 32. Preferably each fastener assembly 42 includes a partially threaded bolt 44, two washers 46 and a nut 48 eventually passing through holes 50 in the channel 40 and through holes 52 in the bottom edge 38 of the air deflector panel 32 and through the holes 66 of the brackets 54. The two subassemblies of the air deflector panels 32, the bottom channels 40, and the fastener assemblies 42, are in turn selectively positioned and mounted to the vehicle 24, using four bendable and breakable, prescored, predrilled and countersunk brackets 54, and a second fastener assembly 56 and/or metal screw 58.

Figure 4:
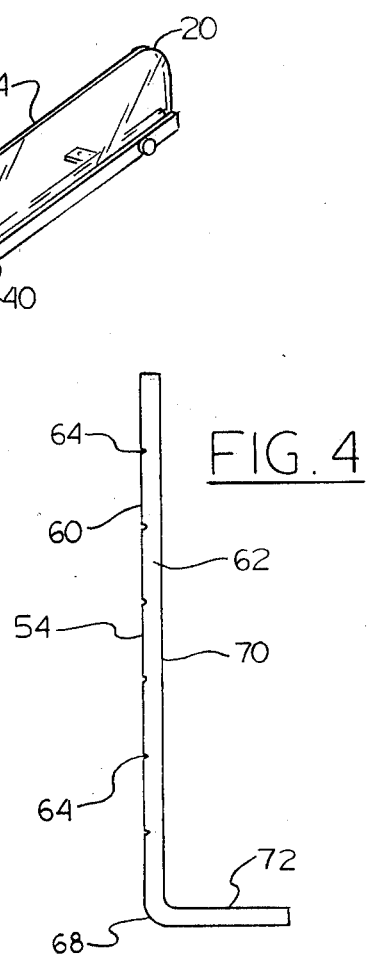
FIGS. 3 and 4 are top and side view of the universal, bendable and breakable, predrilled and countersunk brackets used with the two bottom channels and fasteners to secure the oncoming air spoiler to a vehicle such as the passenger car shown in FIG. 1.
Figure 3:
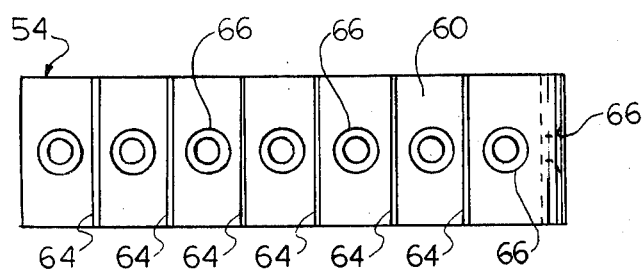

Adaptability of the Oncoming Air Spoiler to Vehicles of Different Exterior Designs Centers on the Bendable, Breakable Brackets Which are Prescored, Predrilled, and Countersunk In FIGS. 3 and 4 the top 60 and the side 62 of the bendable and breakable bracket 54 are illustrated. At several selected places machined scores 64, essentially V notches 64, are provided to serve as a breakaway location, if the bracket 54, must be shortened in making an installation of the oncoming air spoiler 20 to a particular vehicle 24. To insure a flush fit and to give optional choices of where to fasten bracket 54, multiple drilled and countersunk holes 66 are provided throughout its length. Preferably one rounded contour bend 68 is initially provided nearer one end of the bracket 54. As to be subseuently observed, this bend 68 may be used to present either the longer end 70 or the shorter end 72 in the upright position, or the shorter end 72 may be broken away to provide a resulting straight bracket.

Figure 5:
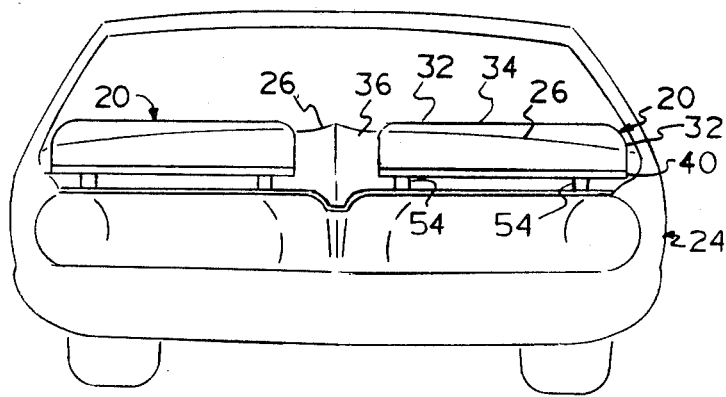
FIGS. 5, 6, 7 and 8, are partial front views of vehicles of different sizes having hoods of different designs to illustrate how the oncoming air spoiler, essentially available in its one embodiment, is universally installed on all vehicles having an extended hood.

Adaptability of the Oncoming Air Spoiler to Vehicles of Different Widths and/or of Different Transverse Frontal Designs In FIGS. 5, 6, 7 and 8 partial front views of vehicles of different sizes often having hoods of different designs are illustrated to indicate how the one kit embodiment of the oncoming air spoiler 20 is universally installed on many vehicles 24 having extended hoods 26. In FIG. 5, the mounting of the oncoming air spoiler 20 on a wide car 24 is shown. The deflector panels 32 and their supporting channels 40 are spaced apart near the centerline of the hood 26. These subassemblies are then secured to the vehicle 24 by using four alike length brackets 54 to space the top edge 34 of each panel 32 slightly above the top 36 of the hood 26, in a selectable range of 2 inches to 6 inches, depending on the overall contour of the vehicle in respect to the overall air flow patterns as they are modified by the presence of the installed oncoming air spoiler 20.

Figure 6:
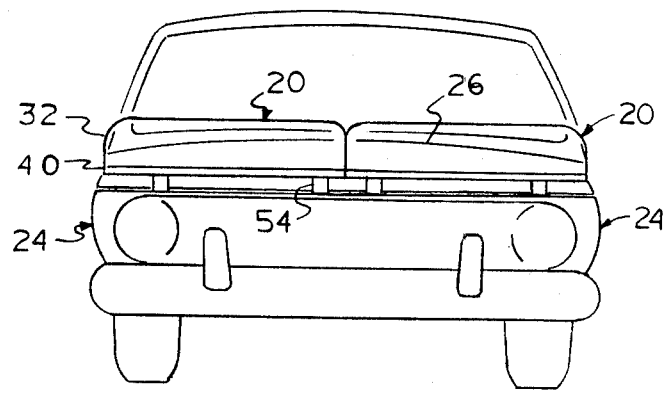
Figure 7:
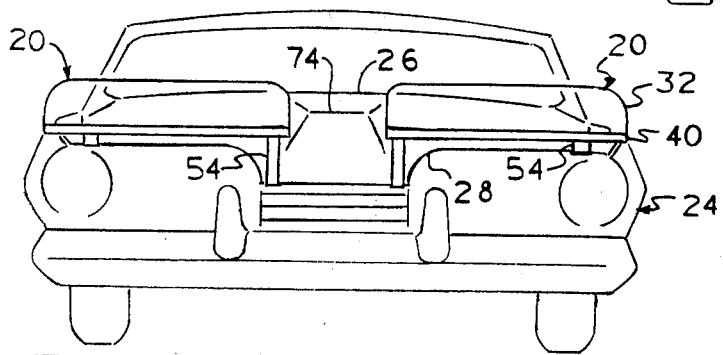
Figure 8:
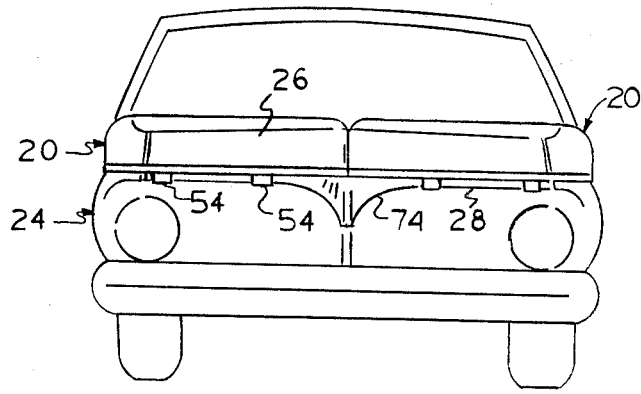

In FIG. 6, the mounting of the oncoming air spoiler 20 on a narrow car 24 is shown. The deflector panels 32 and their supporting channels 40 are not spaced apart. In FIG. 7, the air spoiler 20 is illustrated mounted on a wider car which has an irregular hood 26 having a lower central portion 74. The brackets 54 are therefore modified to be in two different length configurations. In FIG. 8, a narrow car 24 with a hood 26 having a lower central portion 74 is shown with an air spoiler 20 mounted with brackets 54 which are all of the same shorter length. In reference to any of these front views of FIGS. 5, 6, 7 and 8, the outer ends of the respective fronts 28 of the hoods 26 could be angled back from the leading central portions 74 of the hoods 26, as viewed in a horizontal plane, and the oncoming air spoilers would be consequently mounted to match the angled fronts 28 of these hoods 26.

Figure 9:
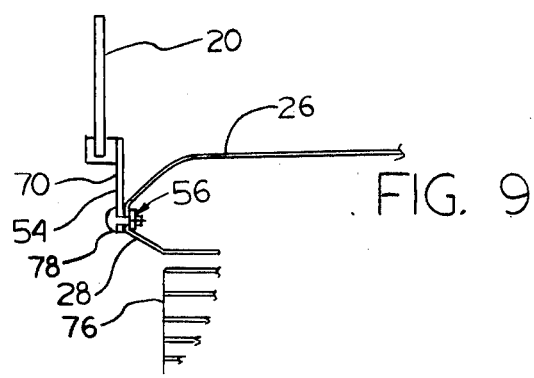
FIGS. 9, 10, 11, 12, 13 and 14, are partial side views of hoods and grills of differently designed vehicles to illustrate how the oncoming air soiler, essentially available in its one embodiment, is universally installed on all vehicles having an extended hood, especially indicating the various ways the universal, bendable, and breakable, predrilled and countersunk brackets, are utilized.
Figure 10:
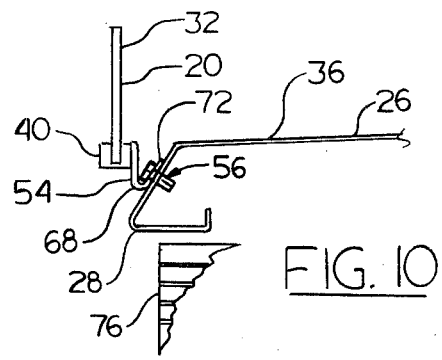
Figure 11:
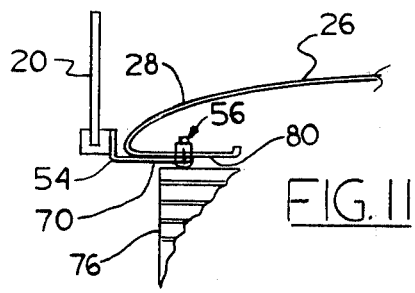
Figure 12:
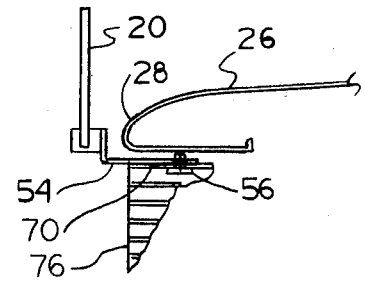

Adaptability of the Oncoming Air Spoiler to Vehicles of Different Longitudinal Frontal Designs In FIGS. 9, 10, 11, 12, 13 and 14 partial side views of vehicles 24, having different longitudinal front designs of their hoods 26 and adjacent grilles 76 are illustrated to show the adaptability of the oncoming air spoiler 20. In FIG. 9, a vertical bracket 54, made from the longer end 70, is shown mounted at its lower end behind a vehicle trim strip 78, and secured to the hood 26 using a second fastener assembly 56 and a hole which generally is already there, being used originally to secure the trim strip 78. In FIG. 10, the shorter end 72 of bracket 54 with its bend 68 increased is directly secured to the hood 26 positioning the subassembly of the deflector panel 32 and supporting channel 40, so the air spoiler 20 is vertical and extending above the top 36 of the hood 26. In FIG. 11, the longer end 70 of bracket 54 is shown placed horizontally and secured to the underside lip 80 of the hood 26. In FIG. 12, the longer end 70 of bracket 54 is illustrated in a horizontal position of attachment to the top of the grille 76, using the fastener assembly 56.

Figure 13:
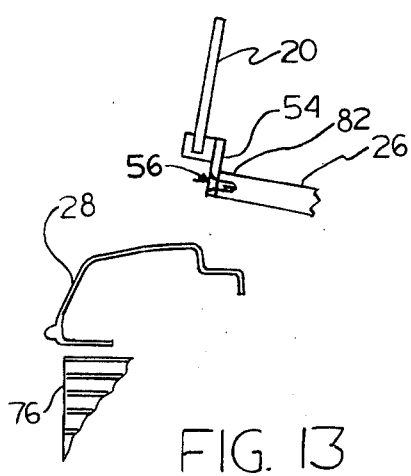
Figure 14:
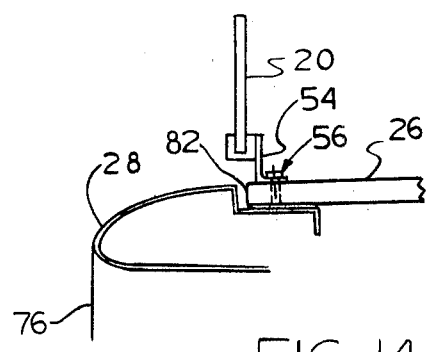

In FIGS. 13 and 14, portions of the bracket 54 are illustrated as they are used, in selected ways of installing oncoming air spoilers 20 to the leading edges 82 of hoods 26, which drop down to be flush with the nonmovable front 28 of an overall hood 26 configuration. Other side and front configurations of hoods, not illustrated, receive the oncoming air spoiler 20 with equal convenience and effectiveness.

We claim:

1. A universally adaptable oncoming air spoiler arranged in two sub assemblies for mounting on wide, medium and narrow width vehicles near or on their extended hoods to deflect air carried bugs, rain, road spray, snow, and lightweight debris up and away from their respective windshields, comprising:
    a. two alike air deflector planar panels having their top corners formed on a radius;
    b. two alike channel supports to respectively co-extensively receive the bottom uniform edges of the two alike air deflector planar panels;
    c. four mounting brackets to hold the universally adaptable oncoming air spoiler on a vehicle, as a pair of these mounting brackets are secured both to a channel support and to the vehicle, and each of the four mounting brackets is a strip of bendable material, scored at selected places along its length for subsequent intentional breaking at a score, drilled and countersunk between the scores, and bent at right angles near one end, independently of any score, thereby providing a choice of having either a long leg of selectable variable bracket length or a short leg positioned vertically, upon installing this universally adaptable oncoming air spoiler to the vehicle; and d. selected multiple fastening assemblies used throughout the universally adaptable oncoming air spoiler, used at three different types of location either to secure the two air deflector planar panels to the respective channel supports, or to secure the respective channel supports to the respective mounting brackets, or to secure the respective mounting brackets to the vehicle.

* * * * *